May 3, 1960 W. L. SHELTON 2,935,079
MIXING VALVE
Filed Oct. 27, 1958

INVENTOR.
WINSTON L. SHELTON
BY
HIS ATTORNEY

United States Patent Office 2,935,079
Patented May 3, 1960

2,935,079
MIXING VALVE

Winston L. Shelton, Jeffersontown, Ky., assignor to General Electric Company, a corporation of New York Application October 27, 1958, Serial No. 769,645

6 Claims. (Cl. 137—110)

This invention relates to valves, and more particularly to the type of valve which provides for mixing of two fluids prior to their emission through a single outlet.

Such valves have found wide usage, particularly in the field of domestic laundry machines where they are used for mixing the hot and cold water to provide warm water. It has been found that adjustability in the proportioning of hot and cold water is desirable so that any intermediate temperature between that of the hot water and that of the cold water may be obtained for the output water. The selection of any particular intermediate temperature will, unless the desired temperature requires the utilization of both hot and cold water in the full amount which can be supplied at the inlets to the valve, involve decreasing the flow of one of the two input flows, that is, decreasing either the hot water flow or cold water flow to provide the desired output water temperature.

In addition to the mixed water desired at certain times, many modern domestic washing machines also require at other times that either all cold water or all hot water be provided to the machine. Where one of the two input flows has been reduced to provide a desired mixed output water temperature, the problem then arises that if thereafter the only liquid to be provided is from the source whose flow to the output has been reduced, an unsatisfactorily slow rate of output flow will be provided. To give a specific example, if hot and cold water are provided and only half the maximum amount of input cold water flow is permitted to pass through to the output to provide a desired mixed water temperature, then, when all cold water is desired, the cold water output alone will be unsatisfactorily low.

It is therefore more desirable to provide flow proportioning valve means which includes means effective upon selection of only one liquid flow to provide a clear unimpeded passage for flow of the liquid, i.e., to remove the flow from the action of the flow proportioning means.

A further object of this invention is to provide such a construction which is automatically operative in response to flow from only one of the inputs to permit full unimpeded passage of the liquid, and which is automatically responsive to flow from both inputs to cause the flow of both inputs to pass under the control of the flow proportioning means.

In carrying out the invention I provide a valve member having a body portion provided with first and second inlet passages and an outlet. A pair of passages connect the inlet passages respectively to the outlet; flow from the pair of passages to the outlet is controlled by flow metering means, so that a desired predetermined proportion of the two liquids from the two inlets is obtained. In order to provide full flow from either inlet when only that one inlet has flow passing through it, I provide in the valve body a chamber which is in communication with both inlet passages and with a fifth passage connecting the chamber to the outlet. In the chamber, I provide pressure sensitive means which controls the flow through the chamber; the means is constructed so as to block communication between the inlet passages and the fifth passage in response to predetermined pressures at both the inlet passages, so that when flow is occurring through both inlet passages it must pass through the flow metering means to reach the outlet. In response to pressure in only one of the inlet passages, the pressure sensitive means opens communication between the inlet passages and the fifth passage so as to permit flow to pass through to the outlet without any effect thereon by the flow metering means. In this manner, the desired proportional flow from the inlets is obtained when a mixture of liquid from the two inlets is dseired, but the amount of water delivered to the outlet from any inlet passage alone is not affected.

The subject matter which I regard as my invention is particularly pointed out and distinctly claimed in the concluding portion of this specification. My invention itself, however, both as to organization and method of operation together with further objects and advantages thereof, may best be understood by reference to the following description taken in conjunction with the accompanying drawing.

Figure 1:
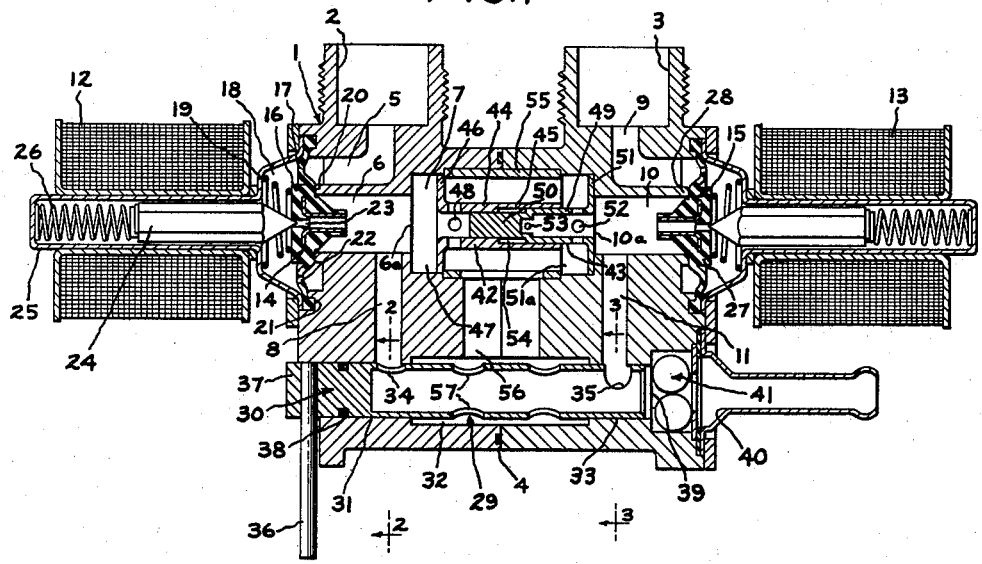
Fig. 1 is a side elevational view, partly in cross section, showing the improved valve construction of my invention.

Referring now to the drawing, I have shown therein my improved valve construction which includes a body portion, generally indicated at 1, having formed therein a first inlet 2 used for the provision of one liquid and a second inlet 3 used for the provision of a second liquid. In the case of a principal usage of valves of this type, i.e., in domestic laundry machines, the two liquids will usually be hot water and cold water. As shown, inlets 2 and 3 may be provided with externally formed threads to facilitate the securement of conduits from the hot and cold water sources. While it has no bearing on the operation of the valve, it is generally desirable for simplicity of manufacture to form the valve of two separate parts joined along line 4, as shown; the valve may be formed of molded plastic material or of metal, as well known in the art.

Inlet 2 communicates through a passageway 5 with an inlet passageway 6. Passageway 6 connects at its end 6a with a chamber 7 and also connects with a passage 8. In similar fashion, inlet 3 communicates through passage 9 with inlet passage 10; passage 10 communicates at end 10a thereof with chamber 7 and also communicates with a passage 11 similar to passage 8. Flow from inlet 2 through passage 5 to passage 6 and from inlet 3 through passage 9 to passage 10 is controlled by appropriate control means which includes a pair of solenoids 12 and 13 respectively associated with the inlets 2 and 3. The solenoids control the flow by controlling respectively diaphragms 14 and 15 which are secured to the valve body, as shown, by any suitable means. The diaphragms are both of the pilot operated type, preferably identical in both construction and operation; thus, the following description of the operation of solenoid 12 and diaphragm 14 will be understood to apply also to solenoid 13 and diaphragm 15.

Diaphragm 14 includes a center or valve portion 16, and an outer flexible portion 17, and is mounted to form a closed chamber 18 with a cap 19 of the solenoid assembly. Valve portion 16 is adapted to seat on an upstanding circular flange 20 formed around the opening of passage 6. The outer flexible portion 17 of the diaphragm is secured at its outer periphery by the cap 19 in an annular groove 21 formed in the valve body. The diaphragm in its normal position shown shuts off communication between passage 5 and passage 6 by seating on flange 20.

The diaphragm includes a small bleed hole 22 through its outer flexible portion whereby the liquid under pressure in passage 5 may leak under pressure through the diaphragm into the chamber 18. The area of the surface of the diaphragm exposed to the liquid pressure in chamber 18 is greater than the area on the other side thereof exposed to the pressure in passage 5. Therefore, provided no liquid can escape through a central aperture 23 in the diaphragm which is normally closed by a solenoid plunger 24, the diaphragm is subjected to a greater force on its outer surface than its inner surface. As a result, the center valve portion 16 of the diaphragm is held down tightly against flange 20 so as to seal the connection between passages 5 and 6. When it is desired to pass flow from inlet 2 through passage 5 to passage 6, solenoid 12 is energized. The solenoid controlled plunger 24, as shown, is arranged for longitudinal movement within a tubular extension 25 of cap 19. The inner tapered end of plunger 24 normally seats in the aperture 23 so that no leakage can occur therethrough. However, as soon as the solenoid is actuated it pulls the plunger away from the diaphragm and opens aperture 23. As a result the liquid in chamber 18 immediately begins to leak through the aperture 23, and since the aperture is larger than the bleed hole 22, the liquid within chamber 18 decreases in quantity and the pressure on the outer side of the diaphragm becomes insufficient to hold the diaphragm seated on flange 20. The diaphragm is then forced off the flange to provide direct communication from passage 5 to passage 6. Liquid from inlet 2 is then free to flow through passage 5 into passage 6 as long as solenoid 12 remains energized.

To shut off the flow, solenoid 12 is de-energized and plunger 24 is returned into contact with the diaphragm by a biasing spring 26 disposed behind it. As soon as the plunger closes the aperture 23, the pressure again begins to build up in chamber 18. This force soon becomes greater than the force applied to the liquid in passage 5 and the valve portion 16 is forced to seat again on flange 20. This closes off the flow from passage 5 to passage 6.

As stated above, the action of diaphragm 15 is identical to that of diaphragm 14, to open or close the connection between the passages 9 and 10 in response to energization or de-energization of solenoid 13. The valve control action is supplied by the seating of the central portion 27 of diaphragm 15 on flange 28.

Figure 2:
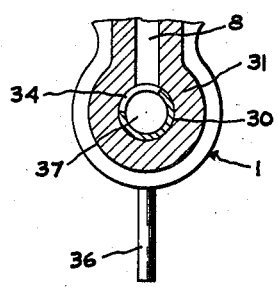
Fig. 2 is a cross sectional view along line 2—2 in Fig. 1.
Figure 4:
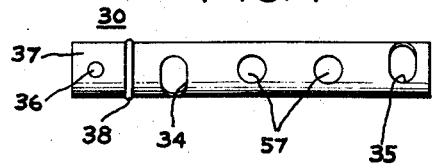
Fig. 4 is a view of the flow metering device used in the construction of Fig. 1.

Passages 8 and 11 lead from passages 6 and 10 respectively into a mixing chamber, generally indicated at 29, formed within valve body 1. A flow proportioning device 30 is positioned so as to extend into mixing chamber 29. The mixing chamber is provided at one end with a first portion 31 of decreased diameter relative to its center portion 32, and with a similar decreased diameter portion 33 at its other end. Device 30 is substantially tubular in shape, with an outer diameter such that it fits relatively snugly yet movably within portions 31 and 33 of the mixing chamber, but has a spaced relation to the mixing chamber in the central portion 32 thereof. For liquid to enter mixing chamber 29 from passage 8 it must flow through an opening 34 formed in the tubular device 30. As can best be seen in Figs. 2 and 4, opening 34 is sufficiently large so that when the device 30 is rotated within valve body 1 it provides no obstruction to flow from passage 8 into chamber 29 during a substantial amount of rotation; during a further period of rotation, device 30 provides an increasing obstruction to passage of liquid from passage 8 into chamber 29 until finally the rotation is sufficient to cause the opening 34 to be completely out of registry with passage 8 so that the passage 8 is in effect blocked off. Device 30 controls the flow from passage 11 into chamber 29 in substantially the same manner: opening 35 is formed in device 30 substantially in alignment with passage 11, and substantially larger than the passage. Thus, during a certain amount of rotation of device 30 flow from passage 11 into chamber 29 is unobstructed, and during a further period of rotation the flow is progressively more obstructed until it is finally blocked off.

Figure 3:
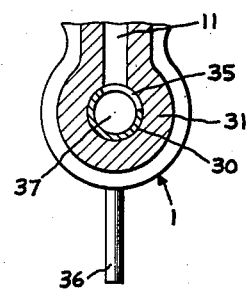
Fig. 3 is a cross sectional view along line 3—3 in Fig. 1.

It is to be observed (Fig. 4) that the openings 34 and 35 are aligned on the surface of device 30 over only about half of their respective lengths, and are angularly offset from each other over the remainder of their lengths. Thus, when the device 30 is in the position shown in Figs. 1, 2 and 3, full flow can occur through both openings 34 and 35 so that the entire flow of hot water and cold water is being permitted to flow into mixing chamber 29. If device 30 is rotated clockwise, as viewed in Figs. 2 and 3, opening 34 will continue to be aligned with passage 8 so that it presents no obstruction, but opening 35 starts to decrease the amount of flow from passage 11 into the chamber 29 as the device 30 increasingly obstructs the opening from passage 11. Thus, rotation in a clockwise direction will provide a decreasing amount of flow from inlet 3 until finally the rotation is sufficient to block the opening from passage 11 completely, at which time only water from inlet 2 will flow into chamber 29. Assuming, purely for illustrative purposes, that hot water is provided through inlet 2 and cold water through inlet 3, clockwise rotation from the position shown provides any combination from full flow of hot water and cold water to all hot water and no cold water.

If device 30 is rotated counterclockwise, then opening 35 continues to be in full registry with passage 11 and opening 34 starts to pass out of registry with passage 8 so that the opening between passage 8 and chamber 29 becomes increasingly obstructed. Thus, rotation in this direction provides any desired combination of hot and cold water from full flow of both hot and cold water to complete closure of the hot water with only cold water flowing.

In the illustrated construction, rotation of device 30 is provided for by means of a manually operable member 36 secured within the solid end 37 of device 30, with suitable sealing means 38 being provided to prevent leakage of liquid along the surface of device 30 to the outside of the valve. It will, however, be understood that any suitable automatically operative construction may be substituted for the manually operable member 36. For instance, it will readily occur that suitable thermostatic control means may be provided for moving device 30 so that regardless of the exact temperature of the water at inlets 2 and 3 a precise desired temperature may be provided in chamber 29.

Chamber 29 has one end 39 thereof in connection with a suitable outlet 40 so that the water delivered to the chamber 29 may be passed through outlet 40 to be used as desired. A suitable flow control device, generally indicated at 41, may be provided at the outlet 40 so as to provide a substantially constant volume of output regardless of the liquid pressure developed as a result of variation of pressures both within the valve itself and in the liquid conduits connected to inlets 2 and 3. While it forms no part of the present invention, flow control devices being well known in the art, a particular construction appropriate for use with the valve structure described in connection with this invention is described and claimed in application Serial No. 611,065 filed on September 20, 1956, by John Bochan and assigned to the General Electric Company, owner of the present invention, now Patent No. 2,908,285.

It will be recalled that passage 6 communicates at its end 6a with chamber 7 and that passage 10 similarly communicates at its end 10a with the chamber 7. Within the chamber there are positioned a pair of members 42 and 43 constituting a pressure sensitive assembly. Member 42 has a first tubular portion 44 with a relatively small internal diameter, which connects with passage 6, and a second tubular portion 45 with a relatively large internal diameter. At the end of section 44 which connects with passage 6, member 42 is formed with an outwardly extending circular flange 46 which has an outer diameter substantially the same as the inside diameter of portion 47 of chamber 7. Adjacent flange 46, portion 44 of member 42 is provided with openings 48 connecting the inside of portion 44 with that part of chamber 7 which is outside member 42.

Member 43 has a first section 49, connecting with passage 10, which is tubular and whose outer diameter is in relatively close sliding fit telescoping relationship with the inner diameter of section 45 of member 42. Member 43 terminates in a closed end section 50 whose outer diameter has a relatively snug sliding telescoping relationship with the inner diameter of section 44 of member 42. At the end of section 49 adjacent passage 10 member 43 is provided with an outwardly extending flange 51 which, similarly to flange 46 of member 42, has approximately the same peripheral dimensions as the internal shape of portion 51a of chamber 7 within which it is designed to move. Adjacent flange 51, openings 52 connect the interior of section 49 to the remainder of chamber 7. An opening 53 provided in member 43 approximately at the junction of sections 49 and 50 communicates with the space 54 which is formed between the exterior surface of section 50 of member 43 and the internal surface of section 45 of member 42.

It will readily be understood that as member 42 and 43 slide relative to each other the length of space 54 is varied. The length of space 54 is at a minimum when both members 42 and 43 have their respective flanges 46 and 51 abutting against a stop member 55 secured within chamber 7. The length of space 54 becomes a maximum when one of the members 42 and 43 is moved relative to the other until its flange abuts the end of chamber 7. The lengths of members 42 and 43 and of their sections are such that when both members 42 and 43 are in the position where flanges 46 and 51 abut the stop 55, section 50 of member 43 blocks openings 48 and section 45 of member 42 blocks openings 52. When either of members 42 or 43 is moved away so that its flange no longer engages the stop member 55 both sets of openings 48 and 52 are uncovered.

Chamber 7 is joined to chamber 29 by a passage 56 which connects the center of chamber 7 with the large diameter portion 32 of chamber 29. Within the confines of the large diameter portion 32, device 30 is provided with a plurality of openings 57 so that in effect there is substantially unobstructed communication between passage 56 and chamber 29 to outlet 40.

The operation of the valve of this invention will now be described. Let it be assumed first that a mixed flow of water, that is, water from both inlets 2 and 3, is to be provided. Solenoids 12 and 13 are energized, and as described above, this moves diaphragms 14 and 15 so that liquid from inlet 2 can flow through passage 5 into inlet passage 6 and liquid from inlet 3 can flow through passage 9 into inlet passage 10. The pressure of water against flange 46 from passage 6 moves that flange to the right as viewed in Fig. 1 until it abuts stop 55. In similar fashion, the pressure of water against flange 51 causes member 43 to be moved until flange 51 also abuts member 55. In this position openings 48 and 52 are closed so that there is no open path for water to flow through chamber 7 into passage 56. The water accordingly flows from inlets 2 and 3 through inlet passages 6 and 10 respectively into passages 8 and 11. The hot water passing through passage 8 is metered into chamber 29 by the action of opening 34 of device 30, and the cold water passing through passage 11 is metered into chamber 29 by the action of opening 35 of device 30. As stated above, device 30 may be manually operated or automatically operated in any desired fashion to provide the desired combination of water from inlets 2 and 3 so that any temperature water between pure cold water and pure hot water may be obtained. The water then flows out from the mixing chamber 29 through flow control device 41 into outlet 40. Thus, with both solenoids 12 and 13 energized, members 42 and 43 cooperate to close the passage through chamber 7 and force the water to flow through passages 8 and 11 so that it is metered in the desired manner to provide the intermediate temperature water.

Let it now be assumed that only hot water is to flow from outlet 40 for a subsequent operation. Let it also be assumed, for purposes of illustration, that the device 30 was set to a position where only a small amount of hot water was allowed to flow into chamber 29. If the same path for the hot water is to be depended upon as before, then the obstruction provided by device 30 will still be present and there will still be the same relatively small flow of hot water. When this is the only water supplied, it is manifestly unsatisfactory to provide such a limited flow and it becomes important for an alternative flow route to be provided.

With solenoid 13 de-energized, there is no flow from inlet 3 into passage 10 and consequently there is no pressure against flange 51. With no pressure on that side of chamber 7, the pressure against the end of section 50 of member 43, which results from the energization of solenoid 12 and the liquid flow through passages 5 and 6, will push member 43 all the way to the right. This uncovers both sets of openings 48 and 52. The uncovering of openings 48 permits water to flow from passage 6 through the openings 48 into chamber 7, and then through passage 56 into mixing chamber 29 and outlet 40. Openings 48 are made large enough so that substantially full flow of hot water from inlet 2 is provided; thus the desired flow of hot water is obtained without any need for readjustment of device 30, and the device remains in the preset position to provide the desired mixed temperature for the next operation requiring flow from both inlets.

If pure cold water from inlet 3 is to be provided from outlet 40, solenoid 12 is de-energized and solenoid 13 is energized. At first, as the flow of water comes against flange 51, member 43 will be moved to the left into engagement with stop 55 and openings 48 and 52 will again be covered so that no water flows therethrough. However, water flowing from inlet passage 10 flows through opening 53 into the space 54 to create a pressure tending to separate the members 42 and 43. With no pressure provided in inlet passage 6 since solenoid 12 is de-energized, member 42 is moved to the left by the pressure within space 54 until flange 46 abuts the end of the chamber. At this time, openings 48 and 52 are again uncovered so that cold water can flow unobstructed from openings 52 into chamber 7 and then down through passage 56 into chamber 29.

Thus, the members 42 and 43 within chamber 7 permit unobstructed and unmetered passage of water whenever only one of the two solenoids 12 and 13 controlling flow from the inlets 2 and 3 is energized. It will be observed that the construction closes off the bypass through chamber 7, and requires the water to follow a path which will provide the desired metering effect, when both solenoids 12 and 13 are energized.

While in accordance with the patent statutes I have described what at present is considered to be the preferred embodiment of the invention, it will be obvious to those skilled in the art that various changes and modifications may be made therein without departing from the invention and I therefore aim in the appended claims to cover all such changes and modifications as fall within the true spirit and scope of this invention.

What I claim as new and desire to secure by Letters Patent of the United States is:

1. A valve member comprising a body portion having first and second inlet passages, an outlet from said body portion, a pair of passages respectively connecting said first and second inlet passages to said outlet, means metering flow from said pair of passages to said outlet in a predetermined proportion, a chamber formed in said body portion in communication with both said inlet passages, a fifth passage connecting said chamber to said outlet, and pressure sensitive means in said chamber controlling flow therethrough, said pressure sensitive means blocking flow through said chamber in response to substantially equal pressures in both said inlet passages and providing communication through said chamber from either one of said inlet passages to said fifth passage in response to a substantial excess of pressure in said one inlet passage over the pressure in said other inlet passage.

2. A valve member comprising a body portion having first and second inlet passages, a mixing chamber formed in said body portion, an outlet formed in communication with said mixing chamber, a pair of passages respectively connecting said first and second inlet passages to said mixing chamber, adjustable means cooperating with said pair of passages and said mixing chamber to meter flow from said pair of passages into said mixing chamber in a predetermined proportion, a second chamber formed in said body portion in communication with both said inlet passages, a fifth passage connecting said second chamber to said outlet, and pressure sensitive means in said second chamber controlling flow therethrough, said pressure sensitive means blocking flow through said second chamber in response to substantially equal pressures in both said inlet passages and providing communication through said second chamber from either one of said inlet passages to said fifth passage in response to a substantial excess of pressure in said one inlet passage over the pressure in said other inlet passage.

3. The valve member defined in claim 2 wherein said flow metering means comprises a metering member contained within said body portion and movable relative thereto, said metering member having a pair of openings formed therein respectively arranged in registry with said pair of passages in one position of said member, said metering member increasingly obstructing one of said pair of passages relative to the other passage of said pair upon movement of said member in one direction as one of said openings moves out of registry with said one passage, said metering member increasingly obstructing the other of said pair of passages upon movement of said member in the opposite direction as the other of said openings moves out of registry with said other passage.

4. A valve member comprising a body portion having first and second inlet passages, an outlet from said body portion, a pair of passages respectively connecting said first and second inlet passages to said outlet, means metering flow from said pair of passages to said outlet in a predetermined proportion, a chamber formed in said body portion in communication with both said inlet passages, a fifth passage connecting said chamber to said outlet, and pressure sensitive means in said chamber controlling flow therethrough, said pressure sensitive means comprising a pair of members movable relative to each other in response to pressure variations in said inlet passages, said members each having openings formed therein for passing liquid through said chamber from said inlet passages to said fifth passage, said members moving to a first position relative to each other in response to substantially equal pressures in both said inlet passages and moving to a second position relative to each other in response to a substantial excess of pressure in either one of said inlet passages over the pressure in the other of said inlet passages, each of said members closing the openings of the other of said members in the first of said positions, said openings of said members being unobstructed when said members are in the second of said positions.

5. A valve member comprising a body portion having first and second inlet passages, an outlet from said body portion, a pair of passages respectively connecting said first and second inlet passages to said outlet, means metering flow from said pair of passages to said outlet in a predetermined proportion, a chamber formed in said body portion, said chamber having its ends in communication with said inlet passages respectively, a fifth passage connecting said chamber to said outlet, and pressure sensitive means in said chamber controlling flow from said inlet passages through said chamber to said fifth passage, said pressure sensitive means comprising a pair of telescoping members each positioned to close an end of said chamber from the adjacent inlet passage, each of said telescoping members including a tubular portion, said tubular portions being in telescoped relation, each of said members having openings formed in the tubular portion thereof, said telescoping tubular portions being movable toward each other to a first predetermined position in response to substantially equal pressures in both said inlet passages and being movable to a second more separated position relative to each other in response to a substantial excess of pressure in either one of said inlet passages over the pressure in the other of said inlet passages, the openings in each of said tubular portions being closed by the other telescoping tubular portion when said telescoping members are in the first of said positions, the openings in each of said tubular portions being unobstructed by the other tubular portion when said members are in the second of said positions thereby to permit flow through said chamber.

6. The valve member defined in claim 5 wherein each of said telescoping members includes an outwardly extending flange at the end thereof adjacent the inlet passage with which it is associated, each said flange closing off said chamber from the adjacent inlet passage and confining flow from said inlet passage to said chamber through said tubular portions and said openings in said tubular portions.

No references cited.